United States Patent [19]

Morse

[11] Patent Number: 4,967,437
[45] Date of Patent: Nov. 6, 1990

[54] HEATED WIPER BLADE ASSEMBLY

[75] Inventor: John W. Morse, Shrewsbury, Mass.

[73] Assignee: Engineering Plastics, Inc., Westboro, Mass.

[21] Appl. No.: 402,544

[22] Filed: Sep. 5, 1989

Related U.S. Application Data

[63] Continuation-in-part of Ser. No. 199,761, May 27, 1988, abandoned.

[51] Int. Cl.$^5$ .......................... B60S 1/04; H05B 3/84
[52] U.S. Cl. ............................... 15/250.07; 219/202; 338/212
[58] Field of Search ........... 15/250.05, 250.06, 250.07, 15/250.08, 250.09; 219/548, 549, 202, 203; 338/212, 214

[56] References Cited

U.S. PATENT DOCUMENTS

| | | | |
|---|---|---|---|
| 3,619,556 | 11/1971 | Deibel | 15/250.42 |
| 3,667,083 | 6/1972 | Linker | 15/250.06 |
| 3,852,570 | 12/1974 | Tyler | 219/549 |
| 4,194,261 | 3/1980 | Parkinson | 15/250.07 |
| 4,587,686 | 5/1986 | Thompson | 15/250.42 |
| 4,603,451 | 8/1986 | VanSickle | 15/250.07 |

FOREIGN PATENT DOCUMENTS 1906670 8/1970 Fed. Rep. of Germany ... 15/250.07

Primary Examiner—Harvey C. Hornsby
Assistant Examiner—Joseph S. Machuga
Attorney, Agent, or Firm—Kenway & Crowley

[57] ABSTRACT

A heated wiper blade assembly for windshields is provided, in which a plastic blade holder has an upper longitudinal groove for receiving a flat electric heating element enclosed in a ribbon of dielectric. The plastic blade holder also has at its lower portion, a longitudinal slot for receiving a wiper blade therein. A metal cap is positioned over the heating element and crimped around the plastic holder to form a wiper blade subassembly. Such subassembly is then mounted in an enclosing wiper housing such that the upper portion of the blade holder with heating element and metal cap or radiator, are positioned within the housing cavity and the lower portion of the blade holder and the wiper blade, face away from the housing, so that upon application of electricity to the heating element, heat is directed into the housing and also applied to the holder and indirectly to the wiper blade. The holder thus protects the wiper blade from direct application of heat and yet is of low cross-sectional profile and is of sufficient flexibility to follow curved windshield contours without early fatigue problems. The enclosing housing protects the radiator and heating element from wind chill and the radiator directs heat into said housing to warm same. The housing then reflects said heat back down around the holder and wiper blade and thus provides sufficient heat to minimize or prevent snow and ice build-up on housing and blade. In another embodiment of the invention, a flat flexible metal blade replaces the metal cap as radiator, to impart added flexibility to the wiper blade assembly.

2 Claims, 4 Drawing Sheets

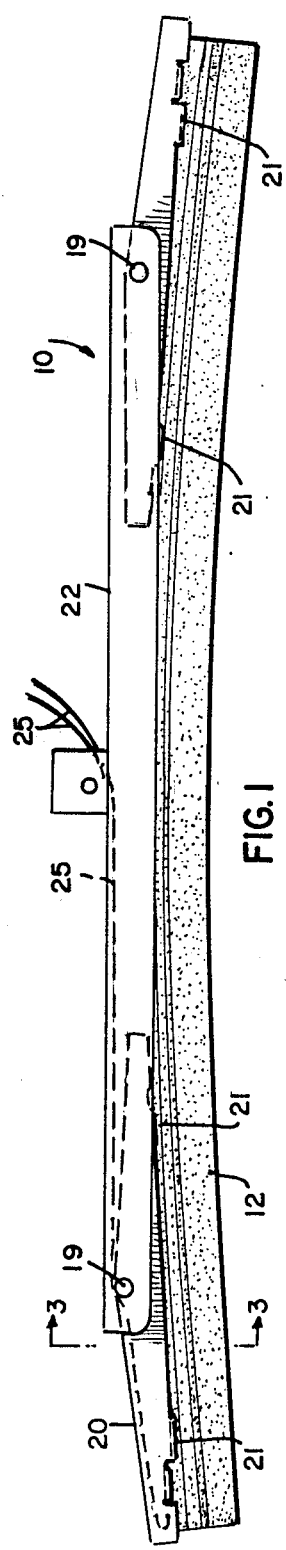
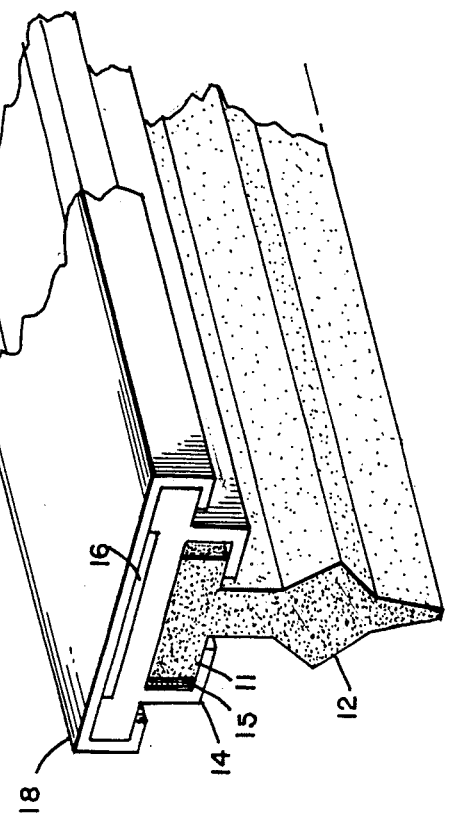

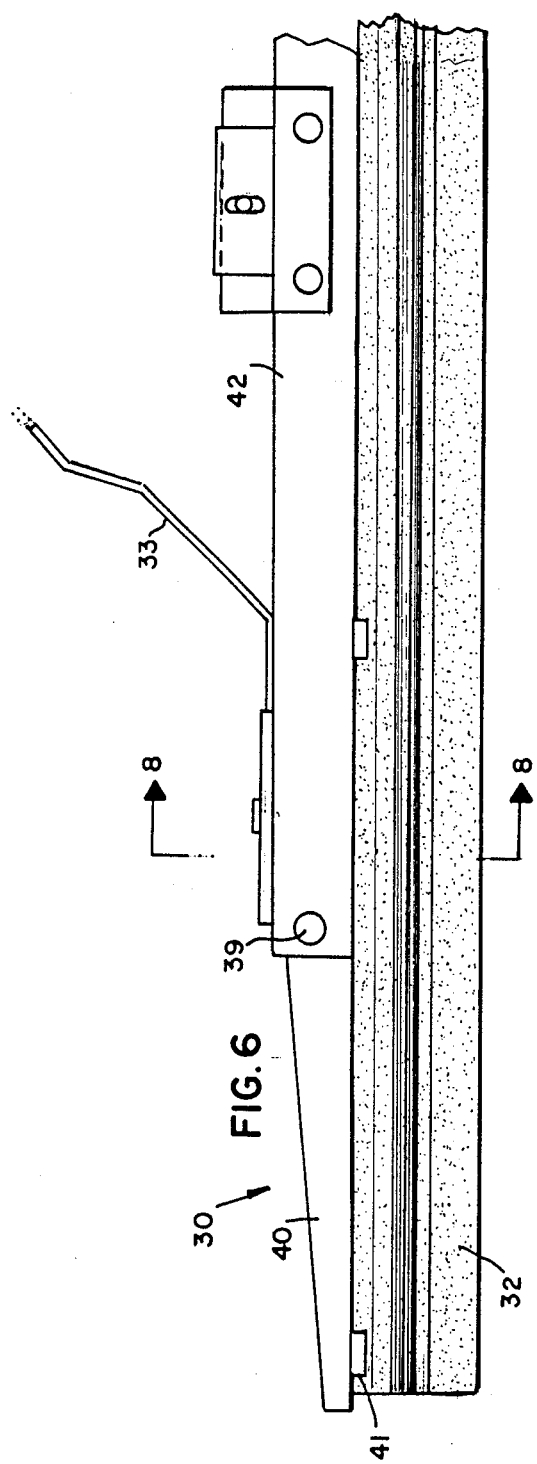
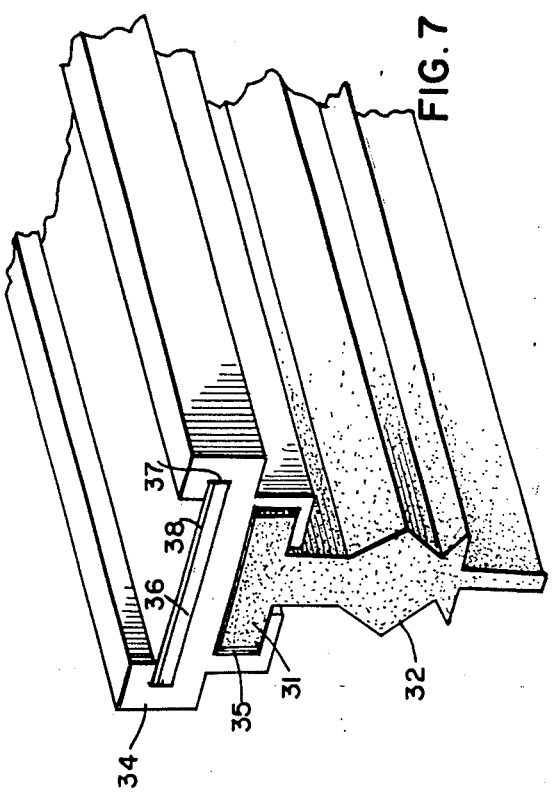

HEATED WIPER BLADE ASSEMBLY

This is a continuation-in-part of application Ser. No. 07/199761 filed 05/27/88, now abandoned.

BACKGROUND OF THE INVENTION

1. Field of the Invention

This invention relates to windshield wipers, particularly heated windshield wipers.

2. The Prior Art

Various cold weather windshield wipers have been devised to prevent or minimize snow and ice buildup thereon, which can impair the effectiveness of the wiper blades in clearing the windshield of precipitation, resulting in reduced or blocked visibility therethrough. In such prior art heated wipers, electrical heating elements have been imbeded either near or in the wiper blades, which proximity frequently has caused damage to such blades when sufficient heat was applied to the heating elements to melt snow and ice thereon e.g. at about 180° F. or more. To prevent such overheating, thermostats have been added to the heating circuits of some prior art heated wipers with the intention of interrupting the flow of current from auto battery to blade heating elements before such blade damaging temperatures would be reached. However, these DC operated thermostats have frequently fused and blade overheating and damage occurred Attempts were then made in the prior art to mount the wiper blade in a holder e.g. of plastic and then mount the heating element in such holder to apply heat to the wiper blade indirectly to prolong the life thereof. One example of this approach is U.S. Pat. No. 4,194,261 to Parkinson (1980). As shown in FIGS. 1 to 3 of this reference, Parkinson provides a rather thick holder or backing member that has a longitudinal groove on its underside for holding the wiper blade thereto and a longitudinal groove on its upper side for holding a heating element therein, which groove has a pair of upwardly converging side walls 38 and 40, which together with wire insulation 98, enclose the heating element 88 therein. Fins 46 and 48 of the holder are believed to mount in a wiper housing, which however is not shown. However, such holder in providing a superstructure (the converging side walls 38 and 40) to enclose the above element has three problems; (a) it is too thick and stiff to follow any significant windshield curvature and thus cannot sweep same clear of water, snow, ice and the like. Also, as the heating element in this reference is totally enclosed in the holder, (b) excessive heat buildup therein can cause softening of the plastic and weakening and distortion thereof. Further, (c) insufficient heat from the so-enclosed heating element can be transmitted to the wiper housing for prevention of snow and ice build-up thereon. Accordingly, there is a need and market for a heated wiper blade that is durable and that overcomes the above prior art shortcomings.

There has now been developed a heated wiper blade that has a holder that protects the wiper blade from direct application of heat thereto, yet is sufficiently flexible to follow curved windshield contours without early fatigue problems and also provides sufficient heat to the wiper housing to minimize or prevent snow and ice buildup thereon.

SUMMARY

Broadly the present invention provides a wiper blade assembly which includes a blade holder having an outside portion and an inside portion, a wiper blade mounted to the blade holder at the outside portion thereof and a flat electric heating element mounted to the holder at the inside portion thereof. The blade assembly further includes a radiator member surmounted on the holder at the inside portion over the heating element and in proximity thereto, the holder being mounted in a wiper housing such that the inside portion, the heating element and the radiator member face into the housing and the outside portion and the wiper blade face away from the housing, such that upon application of electricity to the heating element, heat is applied to the housing and the holder and indirectly transmitted to the wiper blade to reduce or prevent snow and ice buildup on the assembly during operation thereof on a windshield.

BRIEF DESCRIPTION OF THE DRAWINGS

The present invention will become apparent from the following-detailed Specification and drawings in which:

FIG. 1 is an elevation view, partly in schematic, of a portion of the heated wiper assembly embodying the present invention;

FIG. 2 is a fragmentary perspective view of components of the wiper assembly embodying the invention of FIG. 1;

FIG. 6 is an elevation view, partly in schematic, of a portion of another embodiment of the heated wiper assembly of the present invention;

FIG. 7 is a fragmentary perspective view of components of another embodiment of the wiper assembly of the invention.

DESCRIPTION OF PREFERRED EMBODIMENT

Figure 3:
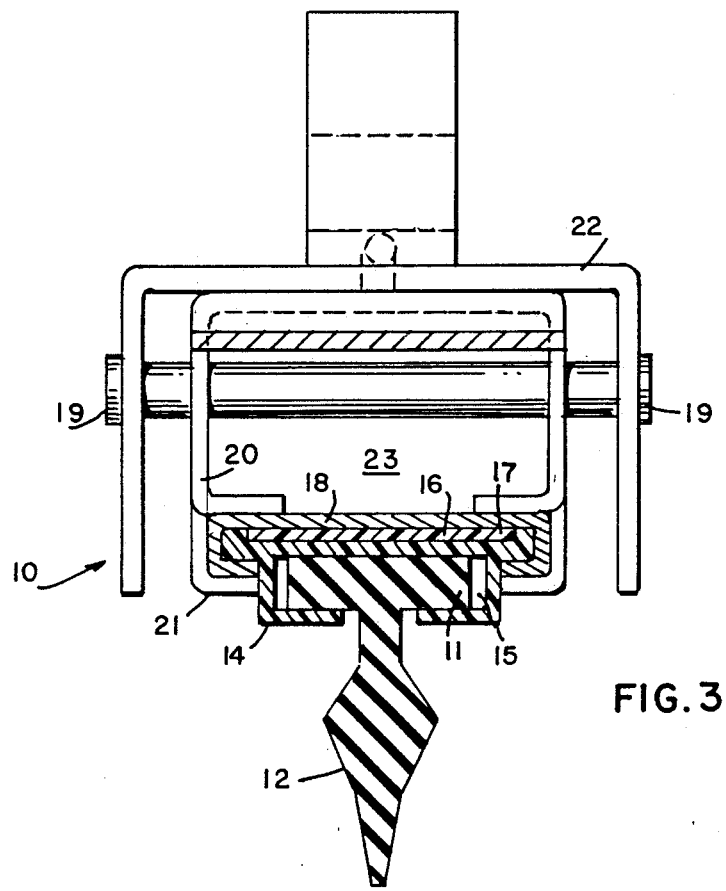
FIG. 3 is a sectional elevation view of the invention shown in FIG. 1, taken on lines 3—3, looking in the direction of the arrows.
Figure 4:
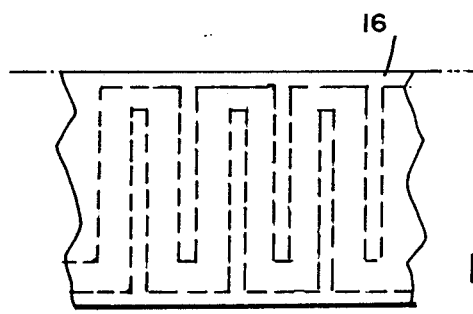
FIG. 4 is a plan view partly in section, of a component of the blade assembly of the invention shown in FIG. 3
Figure 5:
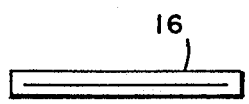
FIG. 5 is an end sectional elevation view of the component of FIG. 4.

Referring now in more detail to the drawings, the heated wiper assembly of the invention 10, includes wiper blade 12, blade holder 14, flat heating element 16, heat conductive cap 18 and wiper housing members 20 and 22, as shown in FIGS. 1, 2 and 3. As indicated, the bead 11 of the wiper blade 12 is inserted into the longitudinal slot 15 of the holder 14, while the flat heating element 16 is inserted into the longitudinal groove 17 of the blade holder 14 as shown e.g. in FIGS. 2 and 3. The heating element 16 is desirably a flat etched foil member enclosed in a dielectric coating, to form a flat flexible ribbon 16, as shown e.g. in FIGS. 3 and 4. The heating element 16 is secured in place in the longitudinal groove 17 of the blade holder 14, desirably by a heat conductive longitudinal cap 18, which is desirably crimped around the upper portion of the blade holder 14 as shown in FIG. 2.

The so-crimped blade holder is then mounted to pivotable housing member 20 at spaced support points 21, which housing 20 is pivotably mounted in turn, to the main housing 22 at pivot point 19, as shown in FIGS. 1 and 3.

Accordingly, the wiper assembly of the present invention has a distinct advantage, as illustrated in FIG. 3, in the central location of the heating element 16, backed by heat conductive cap or radiator 18, which serves to direct heat through the plastic holder 14 and the flexible blade 12 and at the same time, direct heat into the cavity 23 of the housing members 20 and 22, so as to heat such housing members and provide a reflection of heat therefrom back down around the plastic holder 14 and flexible blade 12 so as to provide enough heat to sufficiently de-ice the flexible blade and the entire wiper assembly 10, as indicated in FIGS. 3 and 1 of the drawings.

The radiator is made of metal of high heat conductivity and able to conduct heat rapidly from a heating element, so as to permit the use of a higher wattage heating element than would otherwise be possible without damage to the element itself, adjacent plastic holder or wiper blade.

Further, the invention provides an enclosing wiper housing that extends around the heating element and radiator member, to block and overcome the usual wind-chill factor on the windshield, which as noted above, (a) permits the heat from the radiator to flow up into the enclosing housing and heat it to prevent snow and ice buildup thereon and (b) such housing then reflects the heat back down around the wiper blade, further heating the blade and thus further preventing the buildup of ice and snow on such blade and assembly.

Figure 8:
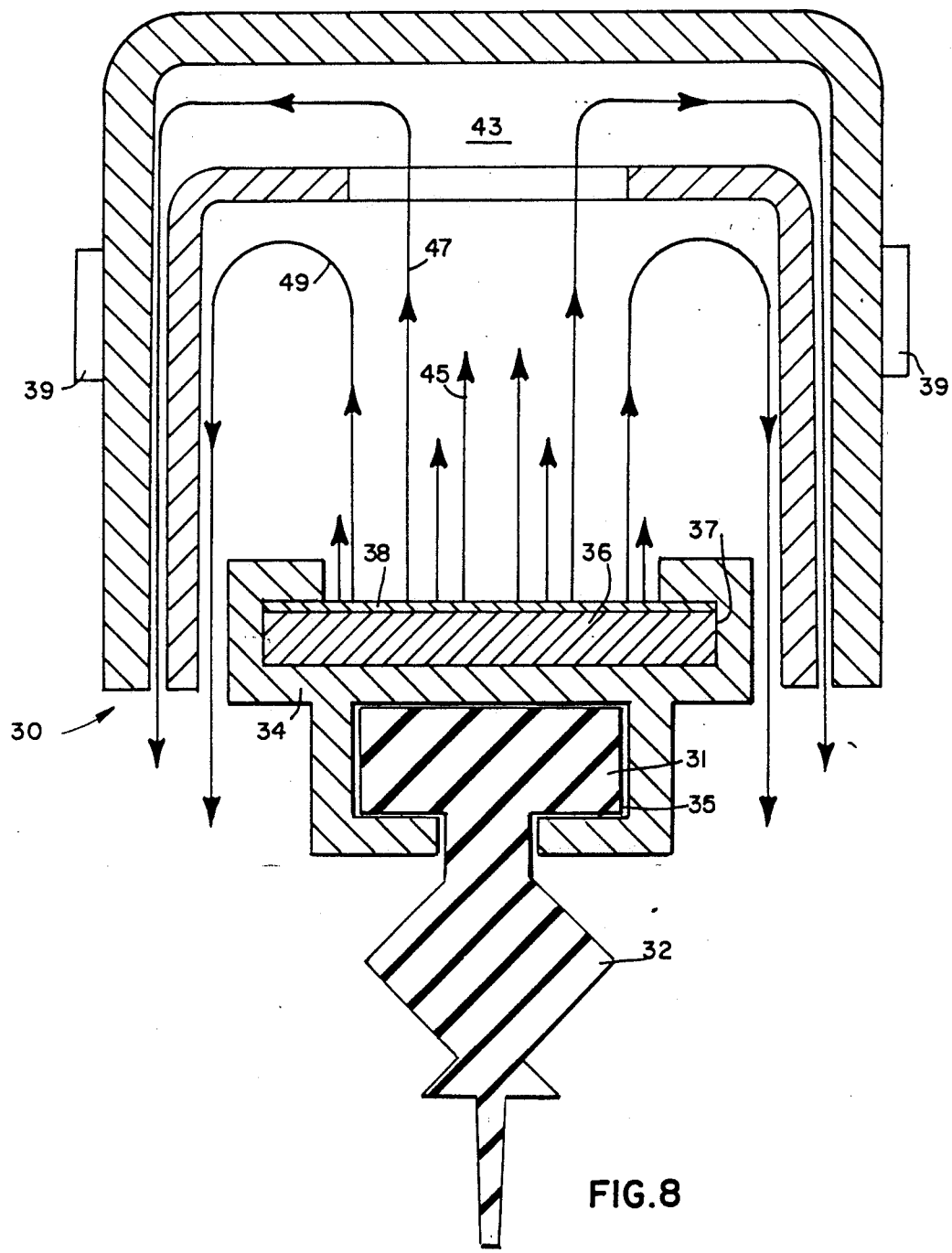
FIG. 8 is a sectional elevation view of the invention shown in FIG. 6, taken on lines 8—8, looking in the direction of the arrows.

In another embodiment, the heated wiper blade assembly of the invention 30, includes wiper blade 32, blade holder 34, flat heating element 36 with electric conductor 33, heat conductive strip or radiator 38 and wiper housing members 40 and 42, as shown in FIGS. 6, 7 and 8. As indicated, the bead 31 of the wiper blade 32 is inserted into the longitudinal slot 35 of the blade holder 34, while the flat heating element 36 and heat conductive longitudinal strip 38, are inserted into the longitudinal groove 37 of the blade holder 34, as shown e.g. in FIGS. 7 and 8.

The heating element 36 is desirably a flat etched foil member enclosed by a dielectric coating, as described above. However, instead of a heat conductive longitudinal cap such as cap 18, shown in FIG. 2 and described above, the radiator 38 is a flat heat conductive longitudinal strip as described above, which permits for greater flexibility of wiper blade assembly as it traverses a curved windshield surface.

The so-assembled blade holder is then mounted to pivotable housing member 40, at spaced support points 41, which housing 40 is pivotably mounted in turn to the main housing 42 at pivot point 39, as shown in FIGS. 6 and 8.

This added embodiment of the present invention also has a distinct advantage, as illustrated in FIG. 8, in the central location of the heating element 36, backed by heat conductive strip or radiator 38, which serves to direct heat through the holder 34 and the flexible blade 32 and at the same time, direct heat into the cavity 43 of the housing members 40 and 42, as shown by the heat flow arrows 45, 47 and 49, so as to heat such housing members and provide a reflection of heat therefrom back down around the holder 34 and flexible blade 32, so as to provide enough heat to sufficiently de-ice the flexible blade and the entire wiper assembly 30, as indicated in FIGS. 8 and 6 of the drawings. This embodiment further exhibits greater longitudinal flexibility as discussed above.

The housing members desirably are of heat conductive material also, including metal, such as stainless steel, aluminum and brass. Preferably the housing members are of metal, coated externally with plastic, such as polytetrafluoroethylene ("Teflon TM") for improved interior heat retention and reflection characteristics and to provide a non-stick surface resistant to the adhesion of ice and snow thereon. Other plastic coatings capable of withstanding high and low temperatures can be used including flurocarbons and polyimides.

The blade holder radiator cap or strip, is desirably of heat-conductive materials including metals, such as stainless steel, aluminum and brass, which radiator overlies, fits over, is attached or is crimped to the blade holder.

The heating element employed in the invention is desirably formed in a flexible ribbon and preferably is an etched foil heater enclosed in a dielectric coating, e.g. of silicon or other dielectric material (as opposed to e.g. a nichrome resistance wire of the prior art). Such etched foil heating elements of the present invention are desirably of low wattage and have the proper resistance and conductivity to preferably allow a maximum element temperature of 300° F. to be reached in an ambient temperature of 70° F., when a DC power source of 12 volts is applied thereto. Of course, greater element temperatures can be permitted at a lower or higher voltage than 12 volts, according to the parameters of the system being employed, within the scope of the present invention.

The electric conductor of the heating element of the invention is preferably shaped in a serpentine, zigzag, mesh or other open configuration to absorb expansion and contractio of the heating element during heating and cooling thereof. However, various other heating elements can be employed, whether of foil, wire or mesh type, which heating elements are desirably enclosed in a dielectric coating in the form of a (relatively flat or curved) flexible ribbon, within the scope of the present invention.

It is desirable that the resistance of a heating element be adjusted so that the wattage output is relatively uniform along its length, whether the heating elements (and wiper blade length) be e.g. 13 inches, 18 inches or 20 inches long. A desirable watt density has been found to be, within the present invention, from three to eight watts per square inch and preferably five to seven watts per square inch. In one example, the heating element of the wiper blade assembly of the present invention is made to have a tolerance of 5.5 to 6.5 watt density, so as to accept the application of 6 watts/sq. in. thereto for effective precipitation removal from the windshield.

As indicated, the object is, even distribution of heat over the full length of the wiper blade and housing and requires a heating element of uniform dimensions to avoid hot spots. The wattage of a heating element can be varied by varying the dimensions thereof and/or the composition thereof, i.e. a change of alloy can mean a change of resistance of the heating element and thus a change in the watt density thereof. It is thus important to adjust the watt density of the heating element sufficiently high to melt snow and ice, but not so high as to damage the heating element or the wiper blade assembly, including the wiper blade. Thus the above watt density considerations are important to a successful and durable wiper blade assembly as embodied in the present invention.

As indicated in FIG. 1, the lead wires to and from the heating element of the invention, exemplified by lead 25 in FIG. 1, can be run within the wiper housing members and out the center of the wiper assembly and down the wiper support arm (not shown) to the power source in the vehicle, as shown in FIG. 1. Of course, various other wiring hookups and configurations can be employed as desired, within the scope of the present invention. Lead wires advantageously have insulation stable at high temperatures e.g. "Teflon", where such wires are enclosed in the heated area e.g. in the housing members 20 and 22 shown in FIG. 1.

The blade holder of the invention is preferably relatively flat in cross-section for flexibility. Further, the blade holder of the invention desirably (but not necessarily) has a longitudinal groove along its inside portion to receive a heating element and a longitudinal slot along its outside portion to receive the wiper blade.

The blade holder is desirably of a plastic that has strength at high and low temperatures and is weather-resistant. The blade holder is advantageously made of durable plastic and is preferably rated at 275° F. or more. For examples, the blade holder is desirably of a stable plastic such as a modified polyphenylene oxide that is stable in a temperature range of −40° F. to +300° F., a modified polyetherimide, which is stable in a temperature range of −400° F. to +430° F. or other stable plastics.

The wiper blade employed in the present invention can have various cross-sectional shapes available, within the scope of the invention and preferably utilizes blades shaped as shown in FIGS. 2 & 3 and 7 & 8.

Such blade is desirably made of durable plastic or rubber or a combination thereof within the scope of the invention. The blade can be subjected to high temperatures e.g. 200°-300° F. and should not harden or crack at such temperatures. Also it should be flexible at low temperatures such as at −32° F. and resistant to various types of harsh environments encountered on the windshield of a vehicle. A preferred material is ethylene-propylene-diene (EPDM), a terpolymer elastomer, e.g. "Nordel TM", a plastic from E. I. duPont Co., Inc. Other materials can be used for the wiper blade of the invention, including natural rubber, neoprene rubber, hydrocarbon elastomers or copolyester elastomers. Additionally, per the invention, one can employ a wiper blade of the above materials, having thermally conductive material added thereto, for improved heat conductivity e.g. material such as carbon and various metals.

The power source for the heated windshield wiper assembly of the invention is desirably the battery of the motor vehicle, e.g. a 6, 12 or 24 volt DC source. Preferably the wiper heating element is fused, switched and wired through the ignition circuit rather than the wiper circuit. This is because if the vehicle is parked in snow and ice conditions and the wipers freeze to the windshield, turning on the ignition will apply current to the heating elements in the wiper assemblies, to warm the wiper blades and free them while the engine is warming up or shortly thereafter. The heater wattage is designed to limit the maximum heat generated to within the safe limits of the high temperature materials used in the wiper assembly.

What is claimed is:

1. A heated windshield wiper blade assembly comprising a plastic wiper blade holder having a relatively shallow longitudinal groove formed in the upper surface thereof and a relatively deep longitudinal groove formed in the lower surface thereof, a wiper blade for contacting said windshield composed of material of relatively high flexibility having a bead portion conforming in shape to, and slightly smaller than said relatively deep longitudinal groove and disposed therein, a flat electrical heating element disposed in said relatively shallow groove and having its lower surface in continuous contact with a surface of said shallow groove, a heat conductive radiator also disposed in said shallow groove and having a lower surface in substantially continuous contact with the upper surface of said heating element, said blade holder being crimped about the edges of said radiator and said heating element to maintain them in place in said shallow groove, housing members substantially enclosing and supporting said blade holder but spaced therefrom to provide an interior cavity for the flow of heat about said blade holder, said housing members protecting said blade holder from wind-chill effects.

2. A heated windshield wiper blade assembly as defined in claim 1 wherein said housing members are substantially U-shaped having open ends facing said windshield whereby heat may flow from said interior cavity about said blade and toward said windshield.

* * * * *